(12) United States Patent
Steuer et al.

(10) Patent No.: US 7,192,379 B2
(45) Date of Patent: Mar. 20, 2007

(54) PLANETARY GEAR MECHANISM FOR A BICYCLE HUB

(75) Inventors: Werner Steuer, Schweinfurt (DE);
Gunter Pehse, Niederwerrn (DE);
Michael Kophaupt, Gochsheim (DE)

(73) Assignee: SRAM Deutschland GmbH (DE)

( * ) Notice: Subject to any disclaimer, the term of this patent is extended or adjusted under 35 U.S.C. 154(b) by 228 days.

(21) Appl. No.: 10/906,787

(22) Filed: Mar. 7, 2005

(65) Prior Publication Data

US 2005/0197230 A1   Sep. 8, 2005

(30) Foreign Application Priority Data

Mar. 6, 2004   (DE) .................... 10 2004 011 052

(51) Int. Cl.
*F16H 3/44* (2006.01)
(52) U.S. Cl. .................................................. 475/297
(58) Field of Classification Search ............... 475/296, 475/297
See application file for complete search history.

(56) References Cited

U.S. PATENT DOCUMENTS

| | | | |
|---|---|---|---|
| 3,432,013 A * | 3/1969 | Matsumoto | 192/217.4 |
| 3,934,493 A | 1/1976 | Hillyer | |
| 4,065,984 A | 1/1978 | Nakajima | |
| 5,078,664 A | 1/1992 | Nagano | |
| 5,273,500 A | 12/1993 | Nagano | |
| 5,928,103 A * | 7/1999 | Shoge | 475/297 |
| 5,967,937 A | 10/1999 | Matsuo | |
| 2002/0151404 A1 | 10/2002 | Steuer | |

FOREIGN PATENT DOCUMENTS

DE   197 45 419 A1   4/1998
EP   0 531 608 B1   5/1995

* cited by examiner

*Primary Examiner*—Dirk Wright
(74) *Attorney, Agent, or Firm*—Milan Milosevic; Lisa Serdynski

(57) ABSTRACT

A multi-speed hub for a bicycle that includes a hub shell, a hub shaft nonrotatably mounted to the bicycle, a driver, a planetary gearing system for providing a plurality of gear ratios and a control device for selecting the desired gear ratio. The planetary gearing system includes first, second and third planetary gear mechanism. The first planetary gear mechanism includes a first sun gear, a first planet carrier and a first ring gear, The first ring gear also functions as the planet carrier for the second planetary gear mechanism. A second sun gear of the second planetary gear mechanism is connected to the first planet carrier. The second planetary mechanism includes a second ring gear that substantially surrounds the planetary gearing system. A pawl carrier including a plurality of pawls that connect the driver to the planetary gearing system to provide different gear ratios. A stepped planet gear functions as the second and third planet gears. The stepped planet gear alternately engages the second and third sun gears via control pawls.

14 Claims, 2 Drawing Sheets

PLANETARY GEAR MECHANISM FOR A BICYCLE HUB

BACKGROUND OF THE INVENTION

Figure 1:
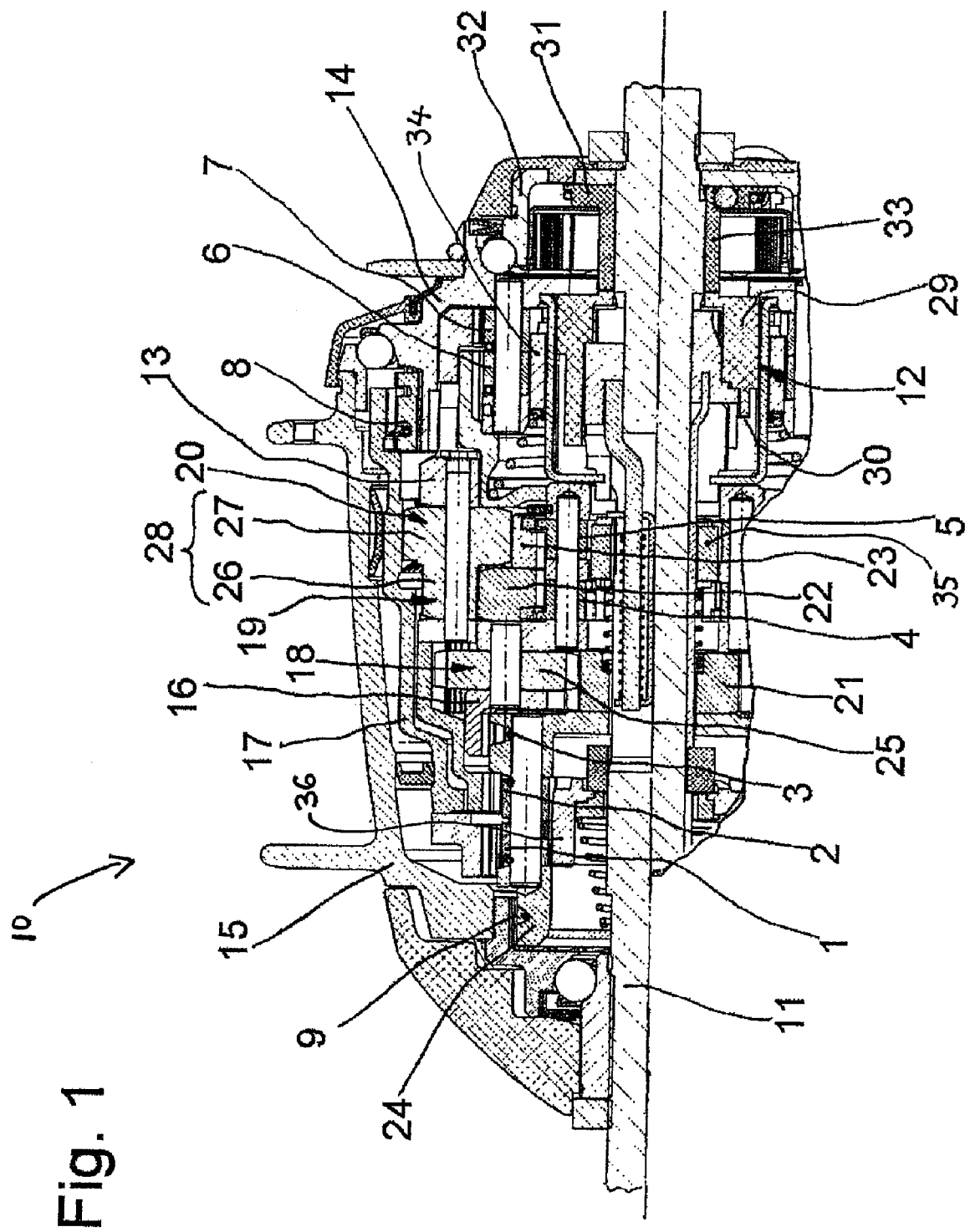

The present invention relates to multi-speed hubs for bicycles and more particular to a bicycle multi-speed hub having first, second and third planetary gear mechanisms that are configured to be controlled exclusively by pawls.

DE 197 45 419 A1 discloses a multi-speed hub for a bicycle that includes a hub shaft, a driver and a hub shell rotatably mounted on the hub shaft. To provide multiple gear ratios between the driver and the hub shell, the multi-speed hub includes a planetary gearing system. The planetary gearing system includes two planetary gear mechanisms that are associated with a shifting device or control device for selecting a desired gear ratio. A sun gear of the first planetary gearing system is joined nonrotatably to the hub shaft. The shifting device includes three coupling elements rotatable about the hub shaft and are couplable with different parts of the planetary gear mechanisms to select the desired gear ratio.

There is a need to refine the above described multi-speed hub by using pawls to join all of the elements participating in torque transfer to achieve a rapid gear change without delay. Further it would be advantageous to have some of the pawls work as automatic pawls, i.e. always engaged and are overrun when the bicycle is coasting (pedals are stationary) or bypassed when the torque path passes through other elements of the system. Also it is desirable to have the shifting device arranged on one side of the multi-speed hub and have it occupy as little space as possible. Still further, it is advantageous to move the controllable pawls by shifting elements that are arranged around the hub shaft and are joined to the shifting device, resulting in the elements of the two planetary gear mechanisms nonrotatably arranged on the hub shaft, in particular a first sun gear of the first planetary gear mechanism, may be fitted on and detachably joined to the hub shaft.

SUMMARY OF THE INVENTION

The present invention provides a multi-speed hub including a planetary gearing system having first, second and third planetary gear mechanisms. The first planetary gear mechanism includes a first sun gear nonrotatably connected to the hub shaft, at least one first planet gear mounted on a first planet carrier and a first ring gear. The second planetary gear mechanism includes a second sun gear mounted to the first planet carrier, a second planet gear mounted on the first ring gear and a second ring gear. The third planetary gear mechanism includes a third sun gear mounted on the first planet carrier and a third planet gear nonrotatably connected to the second planet gear to form a stepped planet gear. Thus the second ring transfers the torque of the third planetary gear mechanism.

A control device controls a plurality of controllable pawls and is located at one end of the hub shaft. The controllable pawls are located near the hub shaft such that the two controllable pawls are accessible from a region around the hub shaft and one automatic pawl is arranged in an outer region of the driver. To create multiple gear ratios, the torque is transferred in multiple ways from the driver or input driver to the pawl carrier and the driver is connected to the planetary gear mechanisms over different torque paths. To transmit torque to a rear wheel of the bicycle, an automatic pawl connects the pawl carrier to the hub shell or output driver. The plurality of gear ratios may be provided because of the following: the second ring gear is connectable via the pawls to the input side of the pawl carrier and to the output side of the pawl carrier, the first ring gear is connectable via pawls to the input side of the pawl carrier and to the output side of the pawl carrier, and the first planet carrier is connectable via pawls to the input side of the pawl carrier and to the output side of the pawl carrier.

The second ring gear, the first ring gear and the first planet carrier extend through the three planetary gear systems of the multi-speed hub, and may be connected in a wide variety of ways by selecting the appropriate pawl engagements. For example, a first gear ratio is provided by the torque following a path from the driver to the second gear through a second automatic pawl to the third planet gear and second planet gear then through a first bypass to second sun gear through a third controllable pawl then through the first planet gear to a second bypass then through the first ring gear to the first planet gear and the first planet carrier to first sun gear through a first automatic pawl and finally through the output side of the pawl carrier to the hub shell through a third automatic pawl.

is also desirable to provide a control device that is arranged on one side of the multi-speed hub and occupies as little space as possible. This is accomplished by providing a control device that includes control elements arranged about the hub shaft to actuate the controllable pawls. Further provided is a cable spool that is actuated to rotate a sleeve that is coupled to a shifting sleeve. The cable spool pulls and releases a control cable connected to a remote actuator operated by a rider. The shifting sleeve has cam surfaces that engage the control elements that control the controllable pawls in accordance with a predefined shifting program. The cable spool and the sleeve may be formed as one-piece to simplify the design and decrease costs. A cup-shaped stationary cone surrounds the sleeve and the cable spool, resulting in a bearing contact between the driver and the stationary cone being shifted to a larger circumference to create room for the cable spool. The control cable extends through a radial opening in the stationary cone and is connected to the remote actuator operated by the rider on the bicycle.

The object of the present invention is to provide a multi-speed hub that includes a plurality of planetary gear mechanisms that are coupled together exclusively by a plurality of pawls that are controlled to provide different gear ratios such that no externally arranged devices are used to shift between the gear ratios.

These and other features and advantages of the present invention will be more fully understood from the following description of certain embodiments of the invention, taken together with the accompanying drawings.

DETAILED DESCRIPTION OF THE DRAWINGS

Figure 2:
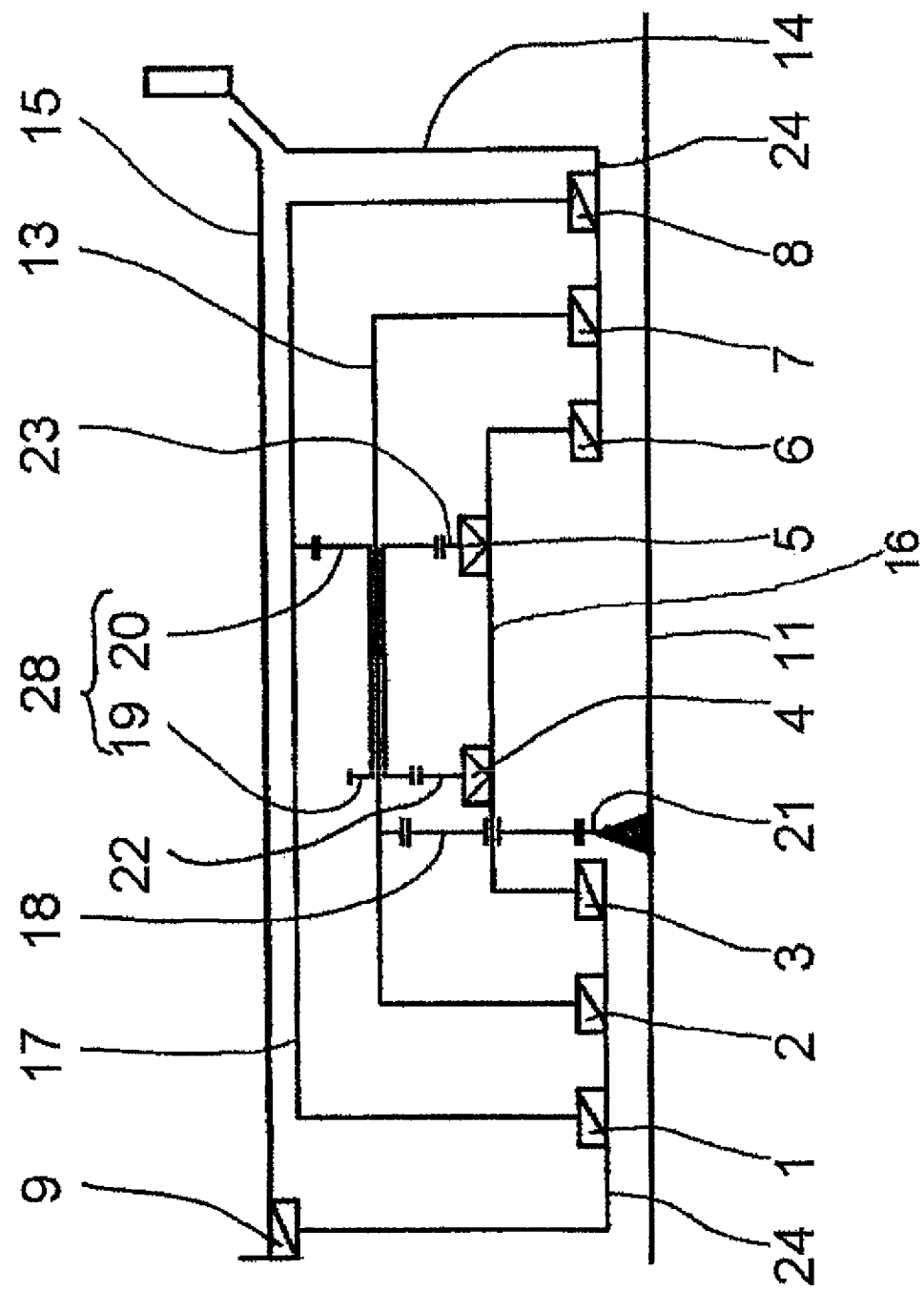

In the drawings:

FIG. 1 is a partial cross-sectional view of a multi-speed hub in accordance with one embodiment of the present invention; and FIG. 2 is a schematic showing the arrangement of three planetary gear mechanisms of the multi-speed hub of FIG. 1.

DETAILED DESCRIPTION

FIGS. 1–2 illustrate a multi-speed hub 10 for a bicycle in accordance with one embodiment of the present invention.

The multi-speed hub 10 generally includes a hub shell 15, a driver 14, a hub shaft 11, a planetary gearing system 37 arranged about the hub shaft 11 and a control device 12 for shifting between gear ratios. The driver 14 is the input driver and the hub shell 15 is the output driver and encloses the planetary gearing system 37. The planetary gearing system 37 includes first, second and third planetary gear mechanisms 25, 26, 27. The first planetary gear mechanism 25 includes a first sun gear 21 nonrotatably mounted about the hub shaft 11, a first planet gear 18 located on a first planet carrier 16 and a first ring gear 13. The second planetary gear mechanism 26 includes a second sun gear 17 arranged on the first planet carrier 16 and a second planet gear 19 mounted on the first ring gear 13 while meshing with a second ring gear 17. The third planetary gear mechanism 27, like the second planetary gear mechanism 26, includes a third sun gear 23 mounted on the first planet carrier 16 while meshing with a third planet gear 20 that is nonrotatably joined to the second planet gear 19, resulting in a stepped planet gear 28. The second ring gear 17 transfers the torque of the third planetary gear mechanism 27.

A control device 12 is actuated to shift between the gear ratios. The control device 12 includes a cable spool 31 for winding a control cable thereon. The rider actuates the control device 12 by pulling and releasing the control cable. The cable spool 31 rotates a sleeve 33 that is rotatably arranged between the hub shaft 11 and a stationary cone 32. The sleeve 33 is substantially below the stationary cone 32. The stationary cone 32 is cup-shaped and surrounds the cable spool 31. The stationary cone 32 also includes an opening extending radially outward for routing the control cable to the cable spool 31. The sleeve 33 rotates a shifting sleeve 29 located in the interior of the multi-speed hub 10. The sleeve 33 includes, at an end facing toward the interior of the multi-speed hub 10, cam surfaces 30 that are engageable with control elements 34, 35, 36 that are axially movable to move a plurality of controllable pawls 1, 2, 4, 5, 6, 7 in and out of engagement. The multi-speed hub 10 also includes first, second and third automatic or noncontrollable pawls 3, 8, 9 which are engaged when the pedals are being driven and torque is being conveyed but are overrun when coasting or when the pedals are stationary.

More specifically, the first automatic pawl 3 is located between the first planet carrier 16 and pawl carrier 24. The second automatic pawl 8 is located between the driver 14 and the first ring gear 13. The third automatic pawl 9 is located between the pawl carrier 24 and the hub shell 15. A first controllable pawl 1 is located between the pawl carrier 24 and the first ring gear 13. A second controllable pawl 2 is located between the second sun gear 22 and the first planet carrier 16. A third controllable pawl 4 is located between the second sun gear 22 and the first planet carrier 16. Alternatively, there may be two pawls located here, acting in both rotation directions. A fourth controllable pawl 5 is located between the third sun gear 23 and the first planet carrier 16. Alternatively, there also may be two pawls here, acting in both rotation directions. A fifth controllable pawl 6 is located between the driver 14 and the first planet carrier 16. A sixth controllable pawl 7 is located between the driver 14 and the second ring gear 17.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A multi-speed hub for a bicycle comprising: a hub shaft nonrotatably mounted to the bicycle; a driver; a planetary gearing system including first and second planetary gear mechanisms, the first planetary gear mechanism having a first sun gear, a first planet carrier, and a first ring gear, the second planetary gear mechanism having a second sun gear connected to the first planet carrier and a second ring gear at least partially surrounding the planetary gearing system; a hub shell surrounding the planetary gearing system; a pawl carrier; and a control device controlling the pawl carrier to connect the driver and the planetary gearing system to provide a desired gear ratio, the pawl carrier including a plurality of controllable pawls, the controllable pawls connecting the pawl carrier to the driver.

2. The multi-speed hub of claim 1 wherein the pawl carrier includes first and second automatic pawls and a third automatic pawl located between the pawl carrier and the hub shell, the plurality of controllable pawls including first, second, third, fourth, fifth and sixth controllable pawls controlled by the control device.

3. The multi-speed hub of claim 1 wherein the control device is arranged about the hub shaft and is actuated from one side of the hub shaft.

4. The multi-speed hub of claim 2 wherein the second ring gear and the first controllable pawl and the second automatic pawl nonrotatably connect the driver to the pawl carrier.

5. The multi-speed hub of claim 2 wherein the first ring gear and the second and sixth controllable pawls nonrotatably connect the driver to the pawl carrier.

6. The multi-speed hub of claim 2 wherein the first planet carrier and the first automatic pawl and the fifth controllable pawl nonrotatably connect the driver to the pawl carrier.

7. The multi-speed hub of claim 1 wherein the controllable pawls are controlled by control elements arranged about the hub shaft, the control elements are operatively connected to the control device.

8. A multi-speed hub for a bicycle comprising: a hub shaft nonrotatably mounted to the bicycle; a driver; a planetary gearing system including first, second and third planetary gear mechanisms, the first planetary gear mechanism having a first sun gear, a first planet carrier and a first ring gear, the second planetary gear mechanism having a second sun gear connected to the first planet carrier, a second planet gear connected to the first ring gear and a second ring gear at least partially surrounding the planetary gearing system, the third planetary gear mechanism having a third sun gear, a third planet gear nonrotatably joined to the second planet gear forming a stepped planet gear, the second sun gear and the third sun gear alternately lockable with the first planet carrier; a hub shell surrounding the planetary gearing system; and a pawl carrier connecting the driver and the planetary gearing system to provide a desired gear ratio.

9. The multi-speed hub of claim 8 wherein the pawl carrier includes a plurality of controllable pawls, a third controllable pawl of the plurality of controllable pawls connects the second sun gear and the first planet carrier in both rotation directions, and a fourth controllable pawl of the plurality of controllable pawls connects the third sun gear with the first planet carrier in both rotation directions.

10. The multi-speed hub of claim 8 wherein the pawl carrier includes a plurality of controllable pawls, the multi-speed hub provides nine gear ratios selectable by control of the controllable pawls.

11. A multi-speed hub for a bicycle comprising: a hub shaft nonrotatably mounted to the bicycle; a driver; a planetary gearing system including first and second planetary gear mechanisms, the first planetary gear mechanism having a first sun gear, a first planet carrier and a first ring gear, the second planetary gear mechanism having a second sun gear connected to the first planet carrier of the first planetary gear mechanism and a second ring gear at least partially surrounding the planetary gearing system; a hub shell surrounding the planetary gearing system; a pawl carrier connecting the driver and the planetary gearing system to provide a desired gear ratio, the pawl carrier including first, second, third, fourth, fifth and sixth controllable pawls; and a control device for controlling the first, second, third, fourth, fifth and sixth controllable pawls to select a desired gear ratio.

12. The multi-speed hub of claim 11 wherein the control device is actuated by a rotary motion about the hub shaft, the control device including a shifting sleeve arranged about the hub shaft and having cam surfaces to move control elements in the axial direction.

13. The multi-speed hub of claim 12 further comprising a sleeve and a cable spool for winding a control cable thereon, the sleeve transferring the rotary motion of the cable spool to the shifting sleeve.

14. The multi-speed hub of claim 13 wherein the sleeve is rotationally arranged below a stationary cone, the stationary cone being cup-shaped and surrounding the cable spool, and the stationary cone having an opening extending radially outward for routing the control cable to the cable spool.

* * * * *